United States Patent [19]

Register

[11] Patent Number: 5,661,632
[45] Date of Patent: Aug. 26, 1997

[54] HAND HELD COMPUTER WITH DUAL DISPLAY SCREEN ORIENTATION CAPABILITY CONTROLLED BY TOGGLE SWITCHES HAVING FIRST AND SECOND NON-MOMENTARY POSITIONS

[75] Inventor: David S. Register, Austin, Tex.

[73] Assignee: Dell USA, L.P., Austin, Tex.

[21] Appl. No.: 537,171

[22] Filed: Sep. 29, 1995

Related U.S. Application Data

[63] Continuation of Ser. No. 177,054, Jan. 4, 1994, abandoned.

[51] Int. Cl.[6] .................................. G06F 1/16; H05K 5/02
[52] U.S. Cl. .......................... 361/683; 361/681; 345/905
[58] Field of Search .......................... 364/708.1, 709.15, 364/710.14; 345/126, 169, 172, 905; 361/681-686

[56] References Cited

U.S. PATENT DOCUMENTS

| | | | |
|---|---|---|---|
| 4,029,915 | 6/1977 | Ojima | 364/709.15 |
| 4,178,633 | 12/1979 | Olander, Jr. et al. | 364/709.15 |
| 4,497,036 | 1/1985 | Dunn | 364/708.1 |
| 5,133,076 | 7/1992 | Hawkins et al. | 364/709.09 X |
| 5,488,575 | 1/1996 | Danielson et al. | 364/708.1 X |

*Primary Examiner*—Michael W. Phillips
*Attorney, Agent, or Firm*—Henry N. Garrana; Mark P. Kahler; Michelle M. Turner

[57] ABSTRACT

A handheld computer has a generally rectangular housing on a front side wall of which a display screen is operatively mounted. A row of toggle switches is also mounted on the front housing side wall, adjacent the display screen, the toggle switches being operatively connected to the computer circuitry within the housing. The toggle switches are manually depressible switch members having first and second non-momentary positions. The housing may be manually grasped in two perpendicular use orientations in each of which the user may reach and operate the toggle switches to control the operation of the computer. One of the toggle switches is operative, via the internal computer circuitry, to selectively rotate, through an angle of 90 degrees, the orientation of data generated on the screen so that in either of the first and second housing use orientations the screen data is in an upright viewing orientation relative to the user of the computer. Because the toggle switches are non-momentary, the orientation of the data generated on the screen is preserved while the handheld computer is turned off.

9 Claims, 3 Drawing Sheets

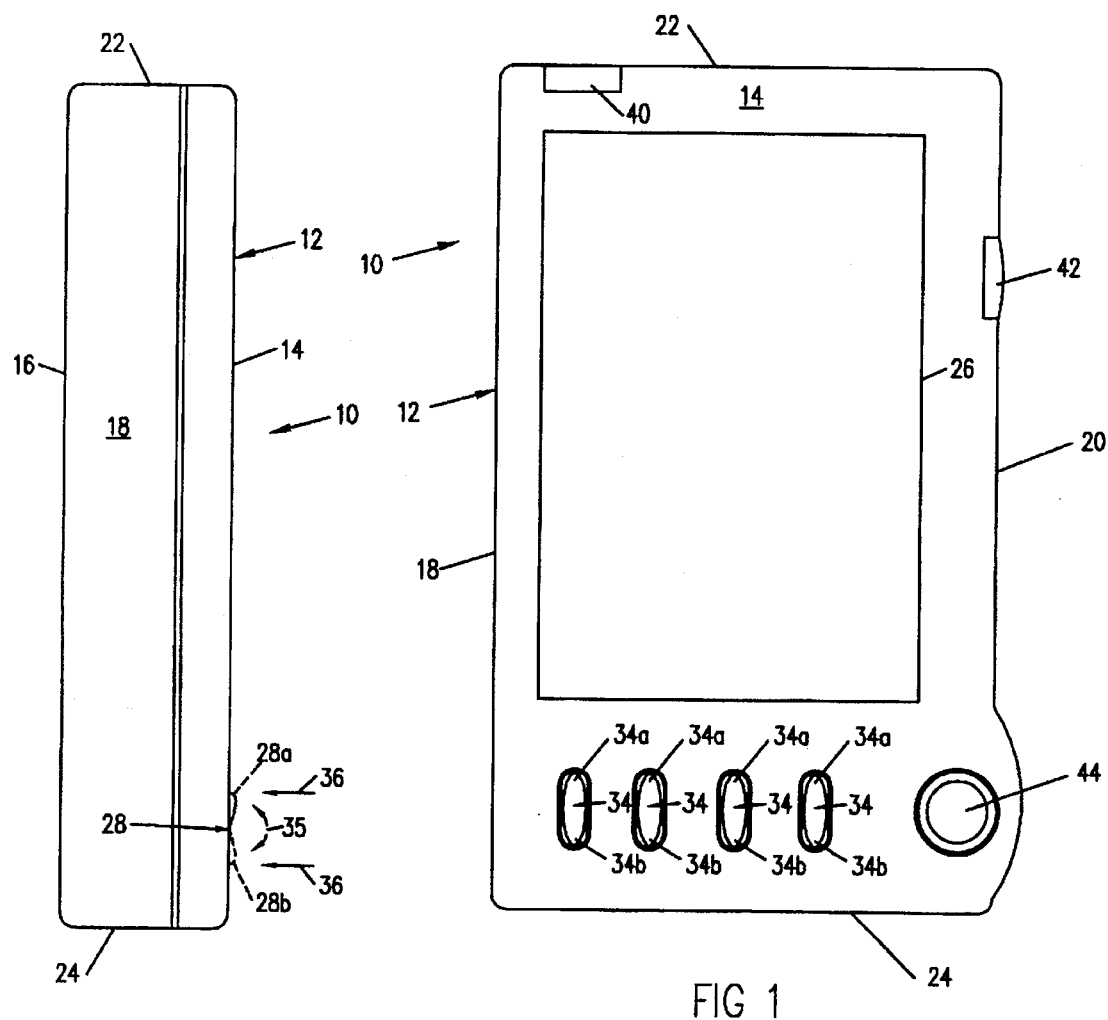
FIG 1
FIG 2
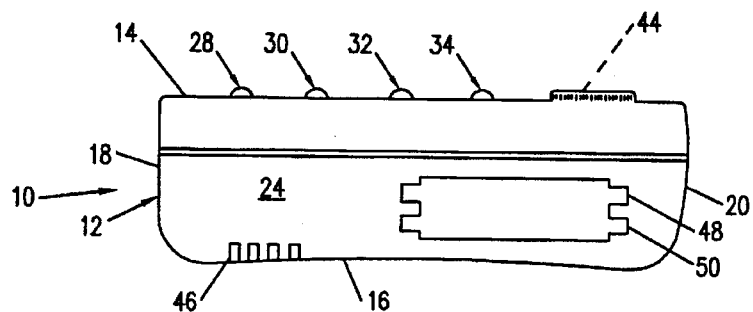
FIG 3

HAND HELD COMPUTER WITH DUAL DISPLAY SCREEN ORIENTATION CAPABILITY CONTROLLED BY TOGGLE SWITCHES HAVING FIRST AND SECOND NON-MOMENTARY POSITIONS

This is a continuation of application Ser. No. 08/177,054, filed Jan. 4, 1994, now abandoned.

BACKGROUND OF THE INVENTION

The present invention relates generally to computer apparatus and, in a preferred embodiment thereof, more particularly relates to portable handheld computers commonly referred to personal digital assistants (PDA's).

Small handheld computers of this general type typically have a correspondingly small elongated rectangular display screen operatively mounted on a front side wall of the computer housing. While manually grasping the computer in its operation and viewing orientation, a user may operate the computer using externally mounted operating switches or buttons on the housing. With the computer in such operation and viewing orientation the display screen is typically in a vertically elongated orientation (i.e., a "portrait" orientation) as seen by the user.

In some software applications, this portrait-only display screen orientation is sufficient for many of the uses for which the miniature handheld computer is intended. However, due to the narrow display width of its portrait-oriented screen there are a variety of applications that are visually hindered by this display screen orientation limitation. In addition, a single orientation display system within a handheld computer may not be ergonomically acceptable to its users. It is accordingly an object of the present invention to provide an improved handheld computer in which these limitations are advantageously eliminated.

SUMMARY OF THE INVENTION

In carrying out principles of the present invention, in accordance with a preferred embodiment thereof, an improved handheld computer is provided that includes a housing having a side wall on which a display screen is operatively mounted. The housing is selectively graspable by a user in a first use orientation in which the housing side wall (and thus the display screen) faces the user, and a second use orientation in which the housing side wall also faces the user and the housing is rotated through a predetermined angle, representatively 90 degrees, relative to its first use orientation.

Circuit means are disposed within the housing and are operative to generate selectively variable data on the display screen. The circuit means have a screen rotation portion that is operable to selectively rotate the orientation of the data relative to the housing, through the aforementioned predetermined angle, between a first data orientation in which the data is viewable by the user in an upright orientation when the housing is in its first use orientation, and a second data orientation in which the data is viewable by the user in an upright orientation when the housing is in its second use orientation.

Manually operable control means are carded externally on the housing and are useable, in either of the first and second housing use orientations, to input control signals to the circuit means to control the generation of the data on the display screen, and to display the data in a selectively variable one of its first and second orientations to thereby visually accommodate the repositioning of the housing from one of its first and second use orientations to the other of its first and second use orientations. Accordingly, when the display screen is of an elongated rectangular shape the data can be displayed thereon in either a portrait orientation during use of the computer in its first use orientation, or in a landscape orientations when the computer rotated 90 degrees to its second use orientation.

BRIEF DESCRIPTION OF THE DRAWINGS

FIG. 1 is a front side elevational view of a handheld portable computer embodying principles of the present invention;

FIG. 2 is a left side elevational view of the computer;

FIG. 3 is a bottom end elevational view of the computer;

DETAILED DESCRIPTION

Figure 4:
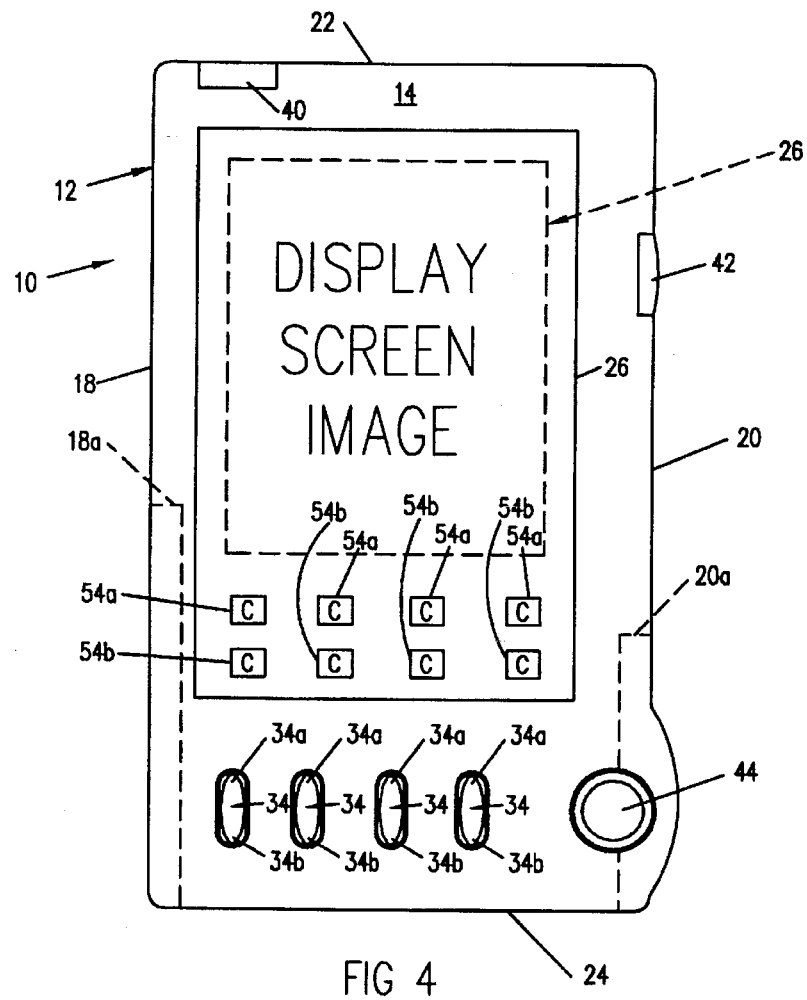
FIGS. 4 and 5 are reduced scale front side elevational views of the computer illustrating its dual screen display orientation capability.

Referring to FIGS. 1–3, in a preferred embodiment thereof the present invention provides a specially designed portable handheld computer 10 that includes an elongated rectangular plastic housing 12 in which the electronic circuitry of the computer is operatively disposed. Housing 12, in the orientation thereof shown in FIGS. 1–3, has a front side wall 14, a rear side wall 16, a left side wall 18, a right side wall 20, a top end wall 22, and a bottom end wall 24.

A display screen 26 is operatively mounted on the front housing side wall 14 and, as viewed in FIG. 1, has a vertically elongated rectangular configuration. Also mounted on the front housing side wall 14, directly beneath the bottom end of the display screen 26, are four horizontally spaced apart, vertically elongated user input toggle buttons 28, 30, 32 and 34 respectively having upper ends 28a, 30a, 32a and 34a and lower ends 28b, 30b, 32b and 34b. Each button or switch is pivotable about a central portion thereof, as indicated by the double-ended arrow 35 in FIG. 2, and is manually depressible by a user of the computer 10 between first and second non-momentary positions.

FIG. 2 representatively illustrates this two position operation for the button 28. Depressing the upper end 28a of button 28, as indicated by the arrow 36, pivots the button to a first, dotted line position thereof. Depressing the lower end 28b of the button 28, as indicated by the arrow 38, pivots the button to a second, solid line position thereof.

Other external components mounted on the computer housing 12 include an I/R window 40 positioned on a top left corner portion of the front side wall 14; an on/off switch 42 positioned on a top right side portion of the front side wall 14 and operatively linked to a battery (not shown) disposed within the housing 12; an "enter" button 44 positioned on a bottom right corner portion of the front side wall 14; and a battery charging connector 46 and a pair of PCMCIA interface slots 48,50 disposed on the bottom end wall 24.

Figure 5:
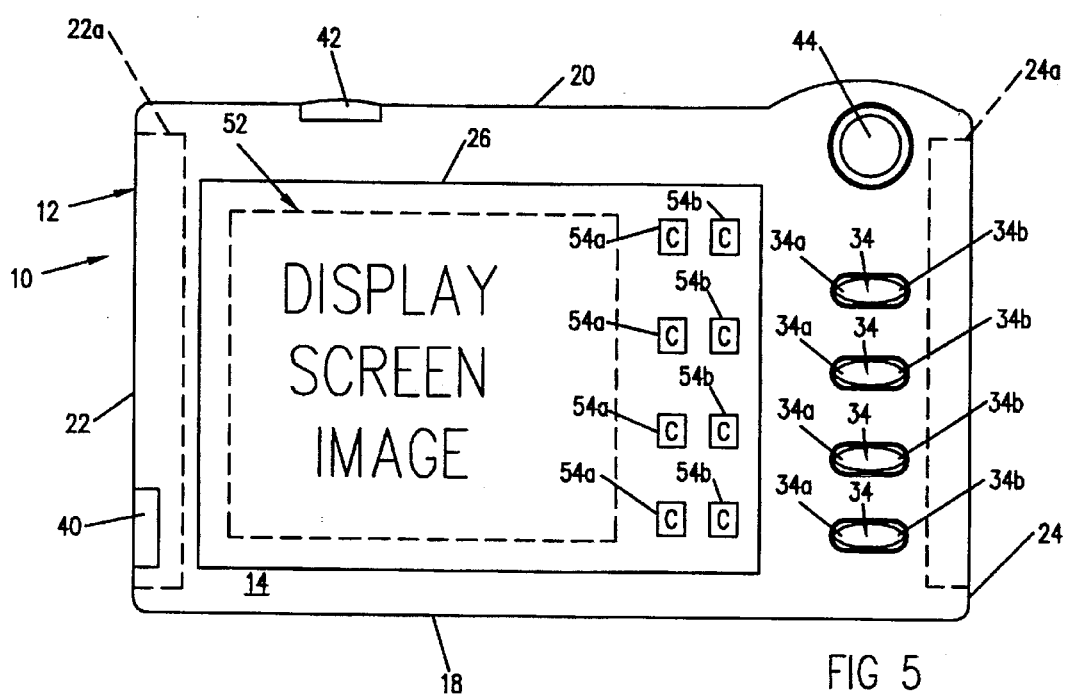

Turning now to FIGS. 4 and 5, according to a primary aspect of the present invention, the handheld computer 10 is specially designed to be operated by a user in a selectively variable one of two different display screen orientations—a "portrait" orientation (FIG. 4) in which the length of the display screen 26 is vertically oriented, and a "landscape" orientation (FIG. 5) in which the length of the display screen is horizontally oriented and rotated ninety degrees in a counterclockwise direction from its FIG. 4 portrait orientation. It should be understood by one skilled in the art that an alternative embodiment envisions a handheld computer 10 which is designed to be operated by a user in a selectively variable one of four different display screen orientations: a) a first orientation which is the "portrait" orientation shown in FIG. 4, and b) three subsequent orientations which are all rotated ninety degrees from a prior orientation, in a counterclockwise direction from the FIG. 4 portrait orientation.

With the computer 10 in its FIG. 4 portrait orientation, the housing 12 is gripped by the user along either or both of the indicated dotted opposite side edge portions 18a,20a of the housing 12 to permit the user to appropriately operate the various control buttons 28, 30, 32, 34 and 44 with one or both of his thumbs, or with the fingers of the non-gripping hand as desired. A variety of software programs may be built into the computer 10, and supplemented with additional programs loaded into the computer by insertion of various PCMCIA cards inserted into the slots 48 and 50 on the bottom end of the computer housing.

When a particular program is selected by the user the program generates on the display screen 26 a display screen image 52 that may comprise text and/or graphics. With the computer 10 in its FIG. 4 portrait orientation, the display screen text and graphics are presented to the user in what may be termed a normal "upright" orientation as shown in FIG. 4—i.e., so that displayed text reads from left to right across the screen. To operate the selected program, in a manner appropriately changing the contents of the contents of the display screen image 52 as necessary, the control buttons 28, 30, 32, 34 and 44 are used.

The operation of the selected program, using the control buttons 28, 30, 32, 34 and 40, is facilitated by the continuous generation on the display screen 26 of four vertical rows of upper and lower command icons 54a,54b. As illustrated in FIG. 4, each vertical command icon row is positioned just above the bottom end of the display screen 26 and horizontally aligned with one of the toggle-type control buttons 28, 30, 32, 34. Different command text and/or graphics "C" is appropriately displayed in each of the command icons 54a, 54b in an "upright" orientation with respect to the user holding the computer 10 in its FIG. 4 portrait orientation. Any of the command icons 54a, 54b may be selected simply by appropriately toggling the control switch aligned with its vertical row.

For example, in the icon row 54a,54b above the toggle control button 28 the upper icon 54a (and thus its associated program command) may be selected by pushing the upper button end 28a in. In a similar manner, the lower icon 54b (and thus its associated program command) may be selected by pushing the lower button end 28b in.

Referring now to FIG. 5, the computer 10 may also be held and used in its landscape orientation by rotating the computer ninety degrees in a counterclockwise direction from its FIG. 4 portrait orientation and gripping the computer along one or both of its indicated dotted line end edge portions 22a,24a. With the computer held in this orientation the user may operate the various control buttons 28, 30, 32, 34 and 44 with his right thumb while gripping the end portion 24a with his right hand, or with any of the fingers on his right hand while gripping the end edge portion 22a with his left hand.

According to a key aspect of the present invention, to accommodate this reorientation of the computer 10 the orientation of its display screen image 52, as well as the command text and/or graphics C within the command icons 54a, 54b may be similarly rotated ninety degrees in a clockwise orientation using one of the toggle buttons 28, 30, 32 and 34 (representatively the toggle button 34). As may be seen by comparing FIGS. 4 and 5, this display reorientation causes both the display screen image 52 and the command text and/or graphics C to be in an "upright" viewing orientation when the computer is shifted from its FIG. 4 portrait orientation to its FIG. 5 landscape orientation. In a manner subsequently described herein the orientation of the display screen image 56 and the command text and/or graphics C may be also switched back to their FIG. 4 portrait orientation using the toggle button 34.

Figure 6:
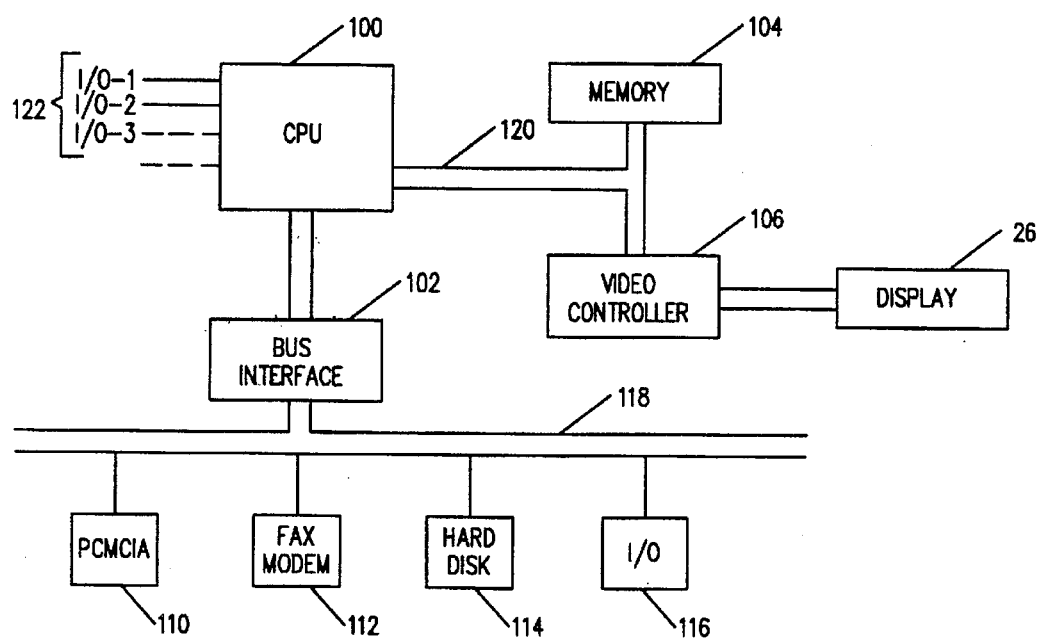
FIG. 6 is a schematic block diagram of representative electronic hardware utilized in the computer.

Referring now to FIG. 6, hardware representatively utilized in the handheld computer 10 includes a central processing unit (CPU) 100 electrically connected to memory 104 and video controller 106 via local bus 120, and a bus interface 102 electrically connected to a system bus 118. The system bus 118 comprises address, data and control buses as are sell known in the art, and provides communication between the CPU 100 and I/O devices such as personal computer memory card interface association (PCMCIA) cards 110, a fax modem 112, a hard disk 114, and other I/O devices 116.

In operation, the CPU 100 executes instructions stored in the memory 104, and communicates information to the video controller 106 to display applicable programs and data on the display screen 26. The CPU 100 has a plurality of I/O interrupt signal lines 122 which are operatively connected to the previously described control buttons 28, 30, 32, 34 and 44 to allow the computer user to input commands to the CPU 100. The signal lines 122 can be used during execution of a display subroutine as further discussed below with reference to FIG. 7.

Figure 7:
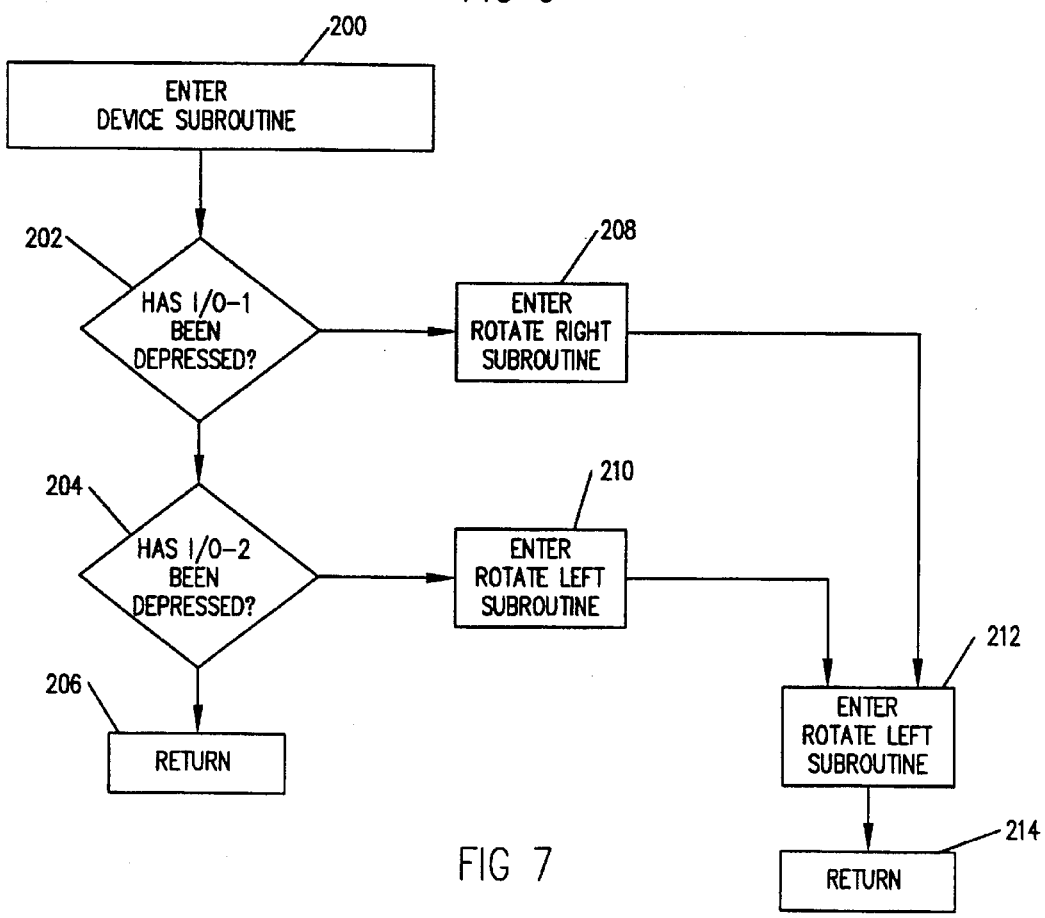
FIG. 7 is a flow chart illustrating a screen display reorientation software program utilized in the computer.

Turning now to FIG. 7, a flow chart is shown which illustrates a software subroutine for execution on the CPU 100 which allows a user of the computer of the handheld computer 10 to selectively change the orientation shown on the screen 26 between the previously described portrait and landscape orientations of the data.

The subroutine starts at step 200. At step 202 the CPU 100 determines whether the I/O-1 interrupt line 122 has changed states. A change in state in this interrupt line may occur when, for example, the upper end 34a of the toggle button 34 is depressed. Depression of the upper end 34a of the toggle button 34 instructs the computing device to change the display orientation by rotating the display to the right—i.e., to bring the display screen image to its FIG. 5 orientation. If the I/O-1 signal line 122 has not changed states, execution proceeds to step 204. At step 204, the CPU 100 determines whether the signal line I/O-2 has changed states. A change in state in this interrupt line may occur when, for example, the lower end 34b of the toggle button 34 is depressed. Depression of the lower end 34b of the toggle button 34 instructs the computing device to change the display orientation by rotating the display to the left—i.e., to bring the display screen image to its FIG. 4 orientation. If the I/O-2 signal line 122 has not changed states, the subroutine returns to the main calling program at step 206.

If, at step 202, the CPU 100 determines that the I/O-1 signal line 122 has changed states the CPU 100 proceeds to step 208. Step 208 then executes a rotate right subroutine. This subroutine informs the operating system of the computer 10 of the new display orientation. The CPU 100 then proceeds to step 212. At step 212, the CPU reads the data within the memory 104 that is displayed by the video controller 106 on the display screen 108. The subroutine then arranges the data patterns within the memory 104 such that the video controller 106 displays the data on the display screen 26 in an orientation that is rotated ninety degrees in a clockwise direction from its previous orientation.

If, at step 204, the CPU 100 determines that the I/O-2 signal line 122 has changed states, the CPU 100 proceeds to step 210. Step 210 then executes a rotate left subroutine. This subroutine informs the operating system of the computer 10 of the new display orientation. The CPU 100 then proceeds to step 212. At step 212 the CPU 100 reads the data within the memory 104 that is displayed by the video controller 106 on the display screen 26. The subroutine then arranges the data patterns within the memory 104 such that the video controller 106 displays the data on the display screen 108 in an orientation that is rotated ninety degrees in a counterclockwise direction from its previous orientation. The CPU 100 then proceeds to step 214 which returns to the calling application program.

In summary, the handheld computer 10 of the present invention may be conveniently grasped and used in either of its mutually perpendicular FIG. 4 and FIG. 5 orientations. To accommodate this selectively variable use orientation of the computer housing 12, the data orientation of the display screen image 52 and the command icons 54a, 54b may be correspondingly changed, representatively using the toggle button 34, in a manner such that it is in a normal "upright" viewing position in either computer housing orientation. As described above, the display screen image 52 is created in its FIG. 4 orientation relative to the housing 12 by depressing the lower end 34b of the toggle button 34, and is created in its FIG. 5 orientation relative to the housing 12 by depressing the upper end 34a of the toggle button 34.

As will be readily appreciated by those of skill in this art, the two computer use positions shown in FIGS. 4 and 5 are merely representative. There could be additional use orientations, with the internal computer circuitry being appropriately modified to variably orient the display screen image to accommodate the shifting of the computer housing relative to the user's normal reading view. As an example, if the FIG. 4 orientation of the computer 10 is considered a first use position of the computer, the second use position could be one in which the computer was rotated 180 degrees from its FIG. 4 orientation, with the screen rotation subroutines modified accordingly. Additionally, it will be readily be appreciated that the computer 10 could be readily provided with more than two use orientations if desired, with the screen display control subroutines being appropriately modified to accommodate each use orientation.

The foregoing detailed description is to be clearly understood as being given by way of illustration and example only, the spirit and scope of the present invention being limited solely by the appended claims.

What is claimed is:

1. A handheld computer comprising:

a housing having a side wall and being selectively graspable by a user in a first use orientation in which said side wall faces the user, and a second use orientation in which said side wall faces the user and said housing is rotated through a predetermined angle relative to its first use orientation;

a display screen operatively mounted on said side wall of said housing;

circuit means disposed within said housing for generating selectively variable data on said display screen, said circuit means having a screen rotation portion operable to selectively rotate the orientation of said data relative to said housing, through said predetermined angle, between a first data orientation in which the data is viewable by the user in an upright orientation when said housing is in said first use orientation, and a second data orientation in which the data is viewable by the user in an upright orientation when said housing is in said second use orientation; and manually operable control means carried externally on said housing and useable to input control signals to said circuit means to control the generation of the data on said display screen, and to display the data in a selectively variable one of said first and second data orientations thereof to thereby visually accommodate the repositioning of said housing from one of said first and second use orientations thereof to the other of said first and second use orientations thereof, said manually operable control means including a plurality of manually depressible switch members carried on said side wall of said housing and having first and second non-momentary positions, said manually depressible switch members being non-momentary to preserve said selectively variable one of said first and second data orientations while said handheld computer is turned off.

2. The handheld computer of claim 1 wherein:

said predetermined angle is approximately ninety degrees.

3. The handheld computer of claim 1 wherein:

one of said toggle switch members is operatively connected to said screen rotation portion of said circuit means in a manner such that when said one of said toggle switch members is in its first depressed position the displayed data is in said first data orientation, and when said one of said toggle switch is in its second depressed position the displayed data is in said second data display orientation.

4. The handheld computer of claim 1 wherein:

the data includes a plurality of rows of first and second command icons, each row being aligned with and operatively associated with a different one of said toggle switch members with the first command icon in the row displaying a circuit means command that may be selected by moving the associated toggle switch member to its first depressed position, and the second command icon in the row displaying a circuit means command that may be selected by moving the associated toggle switch member to its second depressed position.

5. A handheld computer comprising:

a housing having a side wall with a display screen operatively mounted thereon, said housing being selectively graspable by a user in a first use orientation in which said display screen faces the user, and a second use orientation in which said display screen faces the user with said housing being rotated through a predetermined angle relative to said first use orientation; and control means, including selector means externally disposed on said housing and manually operable by the user while grasping said housing in either of its first and second use orientations, said control means creating a selectively variable image on said display screen, said selector means including a plurality of manually depressible switch members carried on said side wall of said housing and having first and second non-momentary positions selectively rotating the orientation of the image relative to said housing, through said predetermined angle, in a manner disposing the image in an upright viewing orientation when said housing is in either of said first and second use orientations thereof, said manually depressible switch members being non-momentary to preserve said viewing orientation while said handheld computer is turned off.

6. A method of using a handheld computer having a housing with a front side on which a display screen is operatively disposed, circuit means operable to create an image on the display screen, and control means externally disposed on said housing, said control means including a plurality of manually depressible switch members carried on said side wall of said housing and having first and second non-momentary positions, said control means operatively linked to said circuit means, and manually operable to selectively vary the image, said method comprising the steps of:

manually grasping said housing in a first use orientation thereof and manually operating said control means to create an image on the display screen;

manually operating said control means to rotate the image, about an axis perpendicular to the display screen, through a predetermined angle relative to said housing; and manually grasping said housing in a second use orientation thereof in which, relative to said first use orientation, said housing is rotated about said axis through said predetermined angle, said manually depressible switch members being non-momentary to preserve a selectively variable one of said first and second data orientations while said handheld computer is turned off.

7. The method of claim 6 wherein:

said step of manually operating said control means is performed in a manner rotating the image in a first direction through a predetermined angle of approximately ninety degrees.

8. The method of claim 7 wherein:

during the performance of said step of manually grasping said housing in said second use orientation said housing is rotated through approximately ninety degrees in a second direction opposite to said first direction.

9. A handheld computer comprising:

a housing having a side wall and being selectively graspable by a user in a first use orientation in which said side wall faces the user, and a second use orientation in which said side wall faces the user and said housing is rotated through a predetermined angle relative to its first use orientation;

a display screen operatively mounted on said side wall of said housing;

first means for generating a selectively variable image on said display screen; and second means including a plurality of manually depressible switch members carried on said side wall of said housing and having first and second non-momentary positions, said second means for selectively rotating the generated image on said display screen through said predetermined angle relative to said housing between first and second viewing orientations to visually accommodate the rotation of said housing between said first and second use orientations, said manually depressible switch members being non-momentary to preserve a selected one of said first and second non-momentary positions while said handheld computer is turned off.

* * * * *